United States Patent
Ahn et al.

(10) Patent No.: US 10,573,895 B2
(45) Date of Patent: Feb. 25, 2020

(54) METHOD OF PREPARING ELECTRODE SLURRY FOR LITHIUM SECONDARY BATTERIES

(71) Applicant: LG Chem, Ltd., Seoul (KR)

(72) Inventors: Byoung Hoon Ahn, Daejeon (KR); Ki Yeon Jo, Daejeon (KR); Sang Hoon Choy, Daejeon (KR); Hyun Sik Chae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/580,474

(22) PCT Filed: Mar. 15, 2017

(86) PCT No.: PCT/KR2017/002774
§ 371 (c)(1),
(2) Date: Dec. 7, 2017

(87) PCT Pub. No.: WO2017/171274
PCT Pub. Date: Oct. 5, 2017

(65) Prior Publication Data
US 2018/0166688 A1   Jun. 14, 2018

(30) Foreign Application Priority Data

Mar. 29, 2016   (KR) .................. 10-2016-0037706

(51) Int. Cl.
*H01M 4/00*   (2006.01)
*H01M 4/62*   (2006.01)
(Continued)

(52) U.S. Cl.
CPC ......... *H01M 4/623* (2013.01); *H01M 4/0404* (2013.01); *H01M 4/13* (2013.01);
(Continued)

(58) Field of Classification Search
CPC ............................... H01M 4/00; H01M 10/00
See application file for complete search history.

(56) References Cited

U.S. PATENT DOCUMENTS

2003/0073000 A1   4/2003   Lee et al.
2011/0014521 A1*  1/2011   Matsuyama ........ H01M 4/0404
                                                    429/217

(Continued)

FOREIGN PATENT DOCUMENTS

JP   2000012001 A       1/2000
JP   2003068280 A   *   3/2003

(Continued)

OTHER PUBLICATIONS

JP 2003068280 A Google Patents (Year: 2003).*
(Continued)

*Primary Examiner* — David P Turocy
*Assistant Examiner* — Mohammad Mayy
(74) *Attorney, Agent, or Firm* — Lerner, David, Littenberg, Krumholz & Mentlik, LLP

(57) ABSTRACT

The present invention provides a method of preparing an electrode slurry for lithium secondary batteries in which the physical properties of the electrode slurry are improved to minimize a drag line by performing the primary mixing process at high viscosity, a method of manufacturing an electrode of which a defect rate of the electrode is reduced and with which battery stability is improved by using the method of preparing an electrode slurry for secondary batteries, an electrode manufactured using the method, and a secondary battery including the electrode.

14 Claims, 1 Drawing Sheet

(51) Int. Cl.

| | | |
|---|---|---|
| *H01M 10/0525* | (2010.01) | |
| *H01M 4/139* | (2010.01) | |
| *H01M 4/13* | (2010.01) | |
| *H01M 4/04* | (2006.01) | |
| *H01M 4/1391* | (2010.01) | |
| *H01M 4/505* | (2010.01) | |
| *H01M 4/525* | (2010.01) | |

(52) U.S. Cl.
CPC ......... *H01M 4/139* (2013.01); *H01M 4/1391* (2013.01); *H01M 4/505* (2013.01); *H01M 4/525* (2013.01); *H01M 4/62* (2013.01); *H01M 10/0525* (2013.01); *H01M 2220/30* (2013.01)

(56) References Cited

U.S. PATENT DOCUMENTS

| | | | |
|---|---|---|---|
| 2013/0011731 A1 | 1/2013 | Jeong et al. | |
| 2015/0044550 A1* | 2/2015 | Park | H01M 4/622 427/122 |
| 2015/0357648 A1 | 12/2015 | Sugimoto et al. | |

FOREIGN PATENT DOCUMENTS

| | | |
|---|---|---|
| JP | 2004247180 A | 9/2004 |
| JP | 2009187819 A | 8/2009 |
| JP | 2015133302 A | 7/2015 |
| KR | 100396492 B1 | 9/2003 |
| KR | 101312265 B1 | 9/2013 |
| KR | 101413433 B1 | 7/2014 |
| KR | 101526677 B1 | 6/2015 |
| KR | 20150114463 A | 10/2015 |

OTHER PUBLICATIONS

JP2004247180A—Google Patents (Year: 2004).*
Lei Shi et al., "Fabrication of poly(vinylidene fluoride-co-hexafluoropropylene)(PVDF-HFP) asymmetric microporous hollow fiber membranes," Journal of Membrane Science, vol. 305, Aug. 12, 2007, pp. 215-225, XP055473618.
Supplementary European Search Report including Written Opinion for Application No. EP17775699 dated Jul. 26, 2018.
Search report from International Application No. PCT/KR2017/002774, dated Jun. 23, 2017.
Cho Ki Yeon et al., "Evaluation of slurry characteristics for rechargeable lithium-ion batteries", Materials Research Bulletin, Elsevier, Apr. 22, 2013, vol. 48, No. 8, pp. 2922-2926, XP028555380.
Extended European Search Report including Written Opinion for Application No. EP17775699.6 dated May 22, 2018.

* cited by examiner

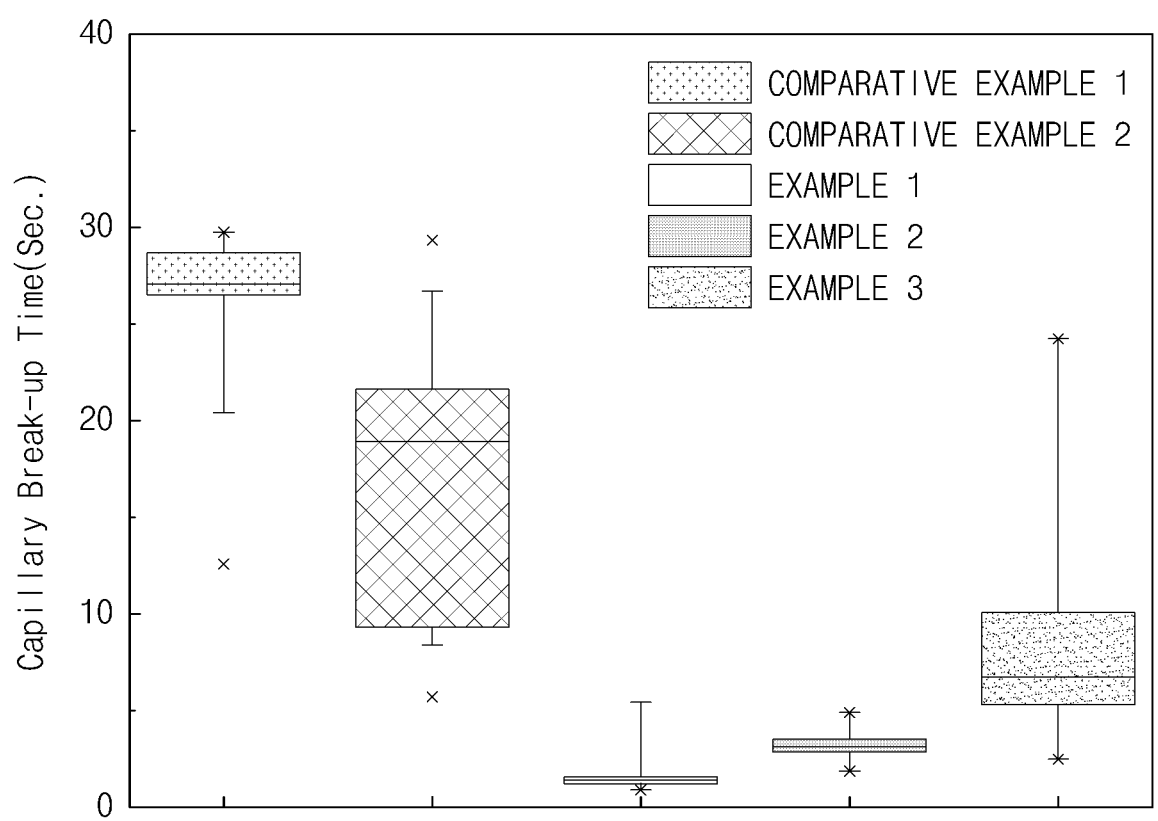

METHOD OF PREPARING ELECTRODE SLURRY FOR LITHIUM SECONDARY BATTERIES

CROSS-REFERENCE TO RELATED APPLICATION

The present application is a national phase entry under 35 U.S.C. § 371 of International Application No. PCT/KR2017/002774, filed Mar. 15, 2017, which claims priority to and the benefit of Korean Patent Application No. 10-2016-0037706, filed on Mar. 29, 2016, the disclosures of which are incorporated herein by reference.

TECHNICAL FIELD

The present invention relates to a method of preparing an electrode slurry for lithium secondary batteries, a method of manufacturing an electrode including the same, and an electrode manufactured using the same.

BACKGROUND ART

Recently, lithium secondary batteries have been used in various fields including portable electronic devices such as mobile phones, personal digital assistants (PDAs), and laptop computers. In particular, in line with growing concerns about environmental issues, research has been actively conducted into lithium secondary batteries having high energy density and discharge voltage as a power source for electric vehicles able to replace fossil fuel-powered vehicles such as gasoline vehicles and diesel vehicles, which are major causes of air pollution, and some of the research is in the commercialization stage.

As devices in which lithium secondary batteries may be used have diversified as described above, lithium secondary batteries have also been diversified to have outputs and capacities suitable for the devices in which the lithium secondary batteries are used.

A pattern coating process is used in which a plurality of coating portions coated with an electrode active material and a plurality of uncoated portions not coated with an electrode active material are formed, such that a battery can be flexibly deformed without causing cracks in an active material coating layer or separation of the coating layer from a current collector even when the battery is bent beyond a certain angle due to the design of various devices.

However, during the pattern coating process, an active material slurry is dragged from one end of the coating portion, and there may be a problem of a drag line, a line along the path on which the active material slurry is dragged, formed on a surface of the uncoated portion. The drag line or drag portion is an abnormal electrode coating portion, which may cause an internal short circuit between a positive electrode and a negative electrode, thereby being a cause of threatening battery stability and increasing a defect rate of the battery.

The drag line may be adjusted by a coating process or physical properties such as viscoelasticity of an active material slurry to be coated, and the inventors of the present invention have found a method of minimizing the drag line in the pattern coating process by controlling the physical properties of the slurry by improving a mixing process of the slurry, thereby completing the present invention.

DISCLOSURE

Technical Problem

An objective of the present invention is to provide a method of preparing an electrode slurry for lithium secondary batteries in which the physical properties of the electrode slurry are improved to minimize a drag line by performing a primary mixing process at high viscosity by adjusting an amount of a binder added.

Another objective of the present invention is to provide a method of manufacturing an electrode for lithium secondary batteries, of which a defect rate of the electrode is reduced and with which battery stability is improved by using the method of preparing an electrode slurry for secondary batteries, and an electrode and a secondary battery manufactured using the same.

Technical Solution

One aspect of the present invention provides a method of preparing an electrode slurry for secondary batteries, including: primarily mixing a first electrode slurry including an electrode active material, a conductive material and a first binder; and secondarily mixing a second electrode slurry including the first electrode slurry and a second binder.

Another aspect of the present invention provides an electrode slurry for secondary batteries, prepared by the above-described method.

Still another aspect of the present invention provides a method of manufacturing an electrode for secondary batteries which includes applying the above-described electrode slurry onto at least one surface of an electrode current collector to form an electrode active material layer, an electrode manufactured by the above-described method, and a lithium secondary battery including the above-described electrode.

Advantageous Effects

The present invention can provide a method of preparing an electrode slurry for lithium secondary batteries in which the physical properties of the electrode slurry can be improved to minimize a drag line by performing a primary mixing process at high viscosity, a method of manufacturing an electrode of which a defect rate of the electrode is reduced and with which battery stability is improved by using the method of preparing an electrode slurry for secondary batteries, an electrode manufactured using the method, and a secondary battery including the electrode.

DESCRIPTION OF DRAWINGS

FIG. 1 is a graph of measuring capillary break-up time of positive electrode slurries prepared according to examples of the present invention and comparative examples.

BEST MODE OF THE INVENTION

Hereinafter, the present invention will be described in detail in order to facilitate understanding of the present invention. Here, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present invention provides a method of preparing an electrode slurry for secondary batteries, including: primarily mixing a first electrode slurry including an electrode active material, a conductive material and a first binder; and secondarily mixing a second electrode slurry including the first electrode slurry and a second binder.

In the present invention, when preparing an electrode slurry for secondary batteries, viscoelasticity of the electrode slurry is adjusted by controlling the amount of the binder.

In the present invention, the first electrode slurry with high viscosity prepared by adding only a part of the binder to the electrode active material and the conductive material is primarily mixed, and then the second electrode slurry with low viscosity prepared by adding the remaining binder into the first electrode slurry is secondarily mixed to form an electrode slurry for secondary batteries.

Here, since the electrode active material and the conductive material are mainly used in a powder or paste state, it is preferable that a solvent and a binder are added to a reactor to prepare a binder solution first such that the binder is sufficiently dissolved in the solvent and then the electrode active material and the conductive material are added thereto.

The binder solution may have a weight ratio of solvent to solid content between approximately 94:6 and approximately 92:8.

In the present specification, the first binder refers to a part of the binder added during the preparation of the first electrode slurry, and the second binder refers to the remaining binder added during the preparation of the second electrode slurry. Further, the electrode slurry for secondary batteries of the present invention refers to a final electrode slurry prepared by secondarily mixing the second electrode slurry.

First, when the first binder is added to the electrode active material and the conductive material, the first electrode slurry having high viscosity can be prepared.

When the shear rates of the primary mixing for mixing the electrode active material, the conductive material, and the first binder are the same, the first electrode slurry having high viscosity receives higher shear stress (shear stress=shear rate*viscosity), which acts as a strong dispersing force, thereby improving dispersibility of the electrode active material and conductive material to improve dispersibility and reduce viscosity of the final electrode slurry.

Accordingly, in the present invention, a drag line is minimized by the primary mixing of the first electrode slurry having high viscosity, and thereby a defect rate of the electrode can be reduced and battery stability can be improved.

According to an embodiment of the present invention, the solid concentration of the first electrode slurry is in the range of 70 to 80%. When the solid concentration of the first electrode slurry is less than 70%, an electrode slurry having high viscosity cannot be prepared. When the solid concentration of the first electrode slurry is more than 80%, mixing and measurement of viscosity are impossible due to lack of a solvent.

Here, the solid content refers to the weight ratio of the solid components in the slurry with respect to the total weight of the slurry, which is calculated as (weight of solid component)/(weight of solid component+weight of liquid component) according to each mixing amount of the components actually used, and measured by a method of drying a final slurry in an oven to remove all water and measuring the remaining weight.

Further, according to an embodiment of the present invention, the viscosity of the first electrode slurry is in the range of 10,000 to 60,000 cps. When the viscosity of the first electrode slurry is less than 10,000 cps, since viscosity is low, shear stress transmission is reduced and the effect of improving dispersibility cannot be attained during mixing. When the viscosity of the first electrode slurry is more than 60,000 cps, mixing and measurement of viscosity are impossible due to lack of a solvent.

Next, the second electrode slurry having low viscosity may be prepared by adding the second binder into the first electrode slurry having high viscosity, and the second electrode slurry is secondarily mixed to finally prepare the electrode slurry for secondary batteries of the present invention.

According to an embodiment of the present invention, the solid concentration of the second electrode slurry is in the range of 60 to 70%. When the solid concentration is higher than the above-described range, since the viscosity of the slurry is high, the flowability of the slurry in a coater, and thus coating processability, is reduced. When the solid concentration is lower than the above-described range, drying with hot air at a high temperature is required in order to remove a large amount of solvent during drying, thereby reducing the productivity of the electrode. Further, the distribution of the binder in the surface layer of the electrode in the drying process is increased to the extent that distribution of the active material and the binder in the electrode becomes nonuniform and the performance of the secondary battery is deteriorated.

Further, according to an embodiment of the present invention, the viscosity of the second electrode slurry is in the range of 8,000 to 12,000 cps. When the viscosity of the second electrode slurry is less than 8,000 cps, workability may be reduced. When the viscosity of the second electrode slurry is more than 12,000 cps, viscosity is so high that a large amount of drag lines may be generated due to difficulty in coating.

According to an embodiment of the present invention, the content ratio of the first binder to the second binder is in the range between 9:1 and 6:4. When an excess amount of the first binder is used, the viscosity of the first electrode slurry is so high that the flowability of the slurry may be reduced to reduce dispersibility during the mixing process. When the amount of the first binder is too small, the solid content of the second electrode slurry may be reduced since it is required to suitably adjust viscosity by adding a solvent.

Further, according to an embodiment of the present invention, the first binder and the second binder may be one or more selected from the group consisting of non-aqueous binders such as a vinylidene fluoride-hexafluoropropylene copolymer (PVDF-co-HEP), polyvinylidenefluoride, polyacrylonitrile, polymethyl methacrylate, polyvinyl alcohol, carboxymethylcellulose (CMC), starch, hydroxypropylcellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, polytetrafluoroethylene (PTFE), polyvinylidene fluoride (PVdF), and the like; aqueous binders such as an acrylonitrile-butadiene rubber, a styrene butadiene rubber (SBR), an acrylic rubber, and the like; and polymer resins such as hydroxyethyl cellulose, carboxymethyl cellulose, polyvinylidene fluoride, and the like. The first binder and the second binder may be the same or different.

Further, the preparation method of the present invention may further include adding a thickener into the first electrode slurry or the second electrode slurry.

When a thickener is used, the solid content ratio of the electrode active material can be increased due to the improved dispersibility of the electrode active material slurry, the stabilization of viscosity of electrode active material slurry, and the uniform distribution of the active material and the conductive material, thereby improving the capacity and the rate characteristics of the lithium secondary battery.

The thickener may be a cellulose-based compound, and the cellulose-based compound used according to an embodiment of the present invention is a water-soluble polymer additive, which is a component included for the effect of increasing solid content and phase stability. Examples of the thickener include one or a mixture of two or more selected from the group consisting of methylcellulose, ethylcellulose, hydroxyethylcellulose, benzylcellulose, triethylcellulose, cyanoethylcellulose, carboxymethylcellulose (CMC), carboxyethylcellulose, aminoethylcellulose, nitrocellulose, cellulose ether, and carboxymethylcellulose sodium salt (CM-CNa).

Further, the content of the cellulose-based compound may be in the range of 0.03 to 5 wt % based on the total weight of the electrode active material slurry. When the content of the cellulose-based compound is less than 0.03 wt %, the binding force of the electrode and the phase stability of the electrode active material slurry cannot be improved. When the content of the cellulose-based compound is more than 5 wt %, since the solid concentration of the electrode slurry is low, the binder and the conductive material may be more distributed on the surface, in which case resistance in the electrode increases since a channel through which current can flow in the electrode is not locally formed or the performance and stability of the battery may deteriorate since the current concentration phenomenon may occur.

According to an embodiment of the present invention, in the method of preparing an electrode slurry for secondary batteries, the electrode may be a positive electrode or a negative electrode.

Further, the present invention provides an electrode slurry for secondary batteries, prepared using the above-described method of preparing an electrode slurry for secondary batteries.

The viscosity of the electrode slurry of the present invention is in the range of 8,000 to 12,000 cps, through which physical properties of the slurry such as viscoelasticity are improved, and thus the drag line can be minimized when an electrode current collector is pattern-coated with the electrode slurry, the defect rate of electrode can be reduced, and battery stability can be ensured.

Further, the present invention provides a method of manufacturing an electrode, which includes applying the above-described electrode slurry onto at least one surface of an electrode current collector to form an electrode active material layer, an electrode manufactured by the above-described method, and a lithium secondary battery including the above-described electrode.

The electrode according to an embodiment of the present invention may be prepared by conventional methods known in the related field. For example, the electrode active material slurry may be applied on a current collector formed of a metal material, compressed and dried to produce an electrode.

A lithium transition metal oxide may preferably be used as the positive electrode active material according to an embodiment of the present invention, and an example thereof may be a mixture of one or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1 and a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2 and a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), and more preferably, may be $Li_x(Ni_aCo_bMn_c)O_2$ (0.9<x<1.2, 0.5≤a≤0.7, 0.1≤b≤0.3, 0.1≤c≤0.3 and a+b+c=1).

Generally, examples of the negative electrode active material include a carbon material which may intercalate or disintercalate lithium ions, a lithium metal, silicon, tin, etc. The carbon material may preferably be used, and both low-crystalline carbon and high-crystalline carbon may be used as the carbon material. Typical examples of the low crystalline carbon may include soft carbon and hard carbon, and typical examples of the high crystalline carbon may include high-temperature calcined carbon such as natural graphite, Kish graphite, pyrolytic carbon, mesophase pitch based carbon fiber, meso-carbon microbeads, mesophase pitches, and petroleum or coal tar pitch derived cokes.

According to an embodiment of the present invention, an electrode active material slurry requires a solvent to form an electrode, and examples of the solvent which may be used include an organic solvent such as N-methylpyrrolidone (NMP), dimethylformamide (DMF), acetone, dimethylacetamide, and the like, or water, and these solvents may be used alone or in a combination of two or more. However, when a negative electrode is formed, water is used as a solvent. An amount of the solvent used may be sufficient if the solvent may allow the electrode active material, the binder, and the conductive material to be dissolved and dispersed therein in consideration of a coating thickness of the electrode active material slurry and manufacturing yield.

Any metal having high conductivity and no reactivity in a voltage range of the battery may be used as the metal current collector, which allows the slurry of the electrode active material to be easily adhered thereto. Non-limiting examples of the positive electrode current collector may include aluminum, nickel, or a foil prepared by a combination thereof, and non-limiting examples of the negative electrode current collector may include copper, gold, nickel, a copper alloy, or a foil prepared by a combination thereof.

The conductive material is not particularly limited as long as it may be generally used in the related field, and examples thereof include artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, and a combination thereof. In general, a carbon black-based conductive material may frequently be used.

The lithium secondary battery according to an embodiment of the present invention may include general lithium secondary batteries such as a lithium metal secondary battery, a lithium ion secondary battery, a lithium polymer secondary battery, a lithium ion polymer secondary battery, etc.

The lithium secondary battery of the present invention may be manufactured using conventional methods known in the related field, and for example, may be manufactured by interposing a porous separator between the positive electrode and the negative electrode, and adding an electrolytic solution in which a lithium salt is dissolved thereto.

The separator may be formed of a porous polymer film, for example, a porous polymer film prepared from a polyolefin-based polymer such as ethylene homopolymer, propylene homopolymer, ethylene-butene copolymer, ethylene-hexene copolymer, or ethylene-methacrylate copolymer, in a single layer or laminate form. Alternatively, the separator may be formed of a commonly used porous nonwoven fabric such as a nonwoven fabric formed of high-melting point glass fiber, polyethylene terephthalate fiber, and the like, but is not limited thereto.

The electrolyte included in the secondary battery according to the present invention may be a mixture of one or more organic solvents selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

Further, the electrolyte according to the present invention may further include a lithium salt, and an anion of the lithium salt may be one or more selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_3)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The secondary battery according to the present invention may be a cylindrical, square, or pouch-type secondary battery, but is not limited thereto as long as the secondary battery is a charging/discharging device.

Further, the present invention may provide a battery module including the lithium secondary battery as a unit cell and a battery pack including the battery module.

The battery pack may be used as a power supply in one or more types of medium- to large-sized devices selected from the group consisting of power tools; electric cars including electric vehicles (EV), hybrid electric vehicles, and plug-in hybrid electric vehicles (PHEV); and power storage systems.

MODES OF THE INVENTION

Now, the present invention will be described in more detail with reference to the following examples. These examples are provided only for illustration of the present invention and should not be construed as limiting the scope and spirit of the present invention.

Example 1

An electrode slurry for secondary batteries of the present invention was prepared such that the weight ratio of the positive electrode active material to the conductive material to the binder is 94.5:3.2:2.3.

Specifically, after a binder solution (solvent:solid content=94:6) was prepared by dissolving a binder (PVDF, molecular weight: 800,000 g/mol) in N-methylpyrrolidone (NMP), a first electrode slurry prepared by adding a positive electrode active material ($LiNi_{0.6}Mn_{0.2}Co_{0.2}O_2$, D50=10 µm, SSA=0.3 m$^2$/g) and a conductive material (primary particle size=25 nm, SSA=130 m$^2$/g, OAN=200 cc/100 g) to a part of the binder solution (first binder) was primarily mixed (Homo-Disper, 3000 rpm, 50 min). Thereafter, a second electrode slurry was prepared by adding the remaining binder solution into the first electrode slurry, and was then secondarily mixed (Homo-Disper, 3000 rpm, 50 min) to prepare an electrode slurry for secondary batteries.

The content ratio of the first binder to the second binder was 6.6:3.4.

Example 2

A positive electrode slurry was prepared in the same manner as in Example 1 except that the content ratio of the first binder to the second binder was 7.7:2.3.

Example 3

A positive electrode slurry was prepared in the same manner as in Example 1 except that the content ratio of the first binder to the second binder was 8.8:1.2.

Comparative Example 1

A positive electrode slurry was prepared in the same manner as in Example 1 except that the amount of binder was not adjusted and added all at once.

Comparative Example 2

A positive electrode slurry was prepared in the same manner as in Example 1 except that the content ratio of the first binder to the second binder was 5.6:4.4.

Experimental Example 1

Measurement of Solid Content and Viscosity of Electrode Slurry

The result of measuring the solid content and viscosity of the positive electrode slurries prepared according to the examples and comparative examples are shown in the following Table 1. The solid content was calculated as (weight of solid component)/(weight of solid component+weight of liquid component) according to each mixing amount of the components actually used, and measured by a method of drying a final slurry in an oven to remove all water and measuring the remaining weight. The viscosity was measured at 25° C. at a shear rate of 12 rpm using a B-type viscometer.

TABLE 1

| | After primary mixing | | After secondary mixing | |
|---|---|---|---|---|
| | Solid content (%) | Viscosity (cps) | Solid content (%) | Viscosity (cps) |
| Example 1 | 74 | 52,000 | 68 | 8,600 |
| Example 2 | 72 | 35,000 | 68 | 9,400 |
| Example 3 | 70 | 16,000 | 68 | 11,100 |
| Comparative Example 1 | — | — | 68 | 13,300 |
| Comparative Example 2 | 76 | Impossible to measure viscosity | 68 | 14,000 |

As shown in Table 1, it can be seen that the viscosity of the final slurry was significantly improved by further performing primary mixing of the first electrode slurry having high solid concentration or high viscosity by adjusting the amount of the binder to be added in Examples 1 to 3 of the present invention.

On the other hand, in Comparative Example 1, the amount of the binder added was not adjusted and the binder was added all at once in a single mixing, and it can be confirmed that the solid concentration was the same as those of the examples, but the viscosity of the final slurry was slightly increased.

Further, it can be seen that, in Comparative Example 2, although the amount of the binder added was adjusted, since the solid content of the first electrode slurry was too high, it was impossible to primarily mix the first electrode slurry and measure the viscosity of the first electrode slurry due to lack of solvent, and the solid concentration became the same as those of the examples by adding the remaining binder, but the viscosity of the final slurry was significantly increased as compared with those of the examples.

That is, it can be seen that the improved viscosity of the slurry of the examples is achieved by performing the primary mixing process at the specified high solid concentration and high viscosity by controlling the amount of binder added.

Experimental Example 2

Measurement of Capillary Break-Up Time of Slurry

In order to evaluate the viscosity of the positive electrode slurries prepared according to the examples and comparative examples, a tensile force was applied to the positive electrode slurries to measure capillary break-up time in a direction of extension (extension rate: 2.2 mm/sec).

TABLE 2

|  | Capillary break-up time (sec) |
| --- | --- |
| Example 1 | 1.58 |
| Example 2 | 3.04 |
| Example 3 | 8.88 |
| Comparative Example 1 | 25.33 |
| Comparative Example 2 | 17.28 |

The capillary break-up time of the slurry is related to the phenomenon of drag lines occurring during pattern coating. Specifically, the longer the capillary break-up time in the slurry extension test is, that is, the slower the break-up rate is, the higher the viscosity of the slurry is, and the higher the probability of the drag lines occurring during pattern-coating of the electrode is.

As shown in Table 2, it can be seen that, in Examples 1 to 3 in which primary mixing at high viscosity was performed, the capillary break-up time in the slurry extension test is shorter than those of Comparative Examples 1 and 2. In particular, the capillary break-up time of Example 1, in which the viscosity during the primary mixing process is the highest, is the shortest, and thus it can be found that the higher the viscosity of slurry during the primary mixing process is, the shorter the capillary break-up time is.

The above description of the invention is only exemplary, and it will be understood by those skilled in the art that various modifications can be made without departing from the scope of the present invention and without changing essential features. Therefore, the above-described examples should be considered in a descriptive sense only and not for purposes of limitation.

The invention claimed is:
1. A method of preparing an electrode slurry for secondary batteries, comprising:
mixing, in a two-step mixing process, an electrode active material, a conductive material, and a total amount of a binder solution to prepare an electrode slurry, wherein the total amount of the binder solution is equal to the sum of a first amount of the binder solution and a second amount of the binder solution, wherein a content ratio of the first amount of the binder solution to the second amount of the binder solution ranges between 9:1 and 6:4, and
wherein the two-step mixing process comprises:
mixing a first electrode slurry including the electrode active material, the conductive material and the first amount of the binder solution, wherein a viscosity of the first electrode slurry after mixing is in a range of 16,000 to 60,000 cps, wherein a solid concentration of the first electrode slurry is in a range of 70 to 75 percent by weight (wt %) based on the total weight of the first electrode slurry;
adding the second amount of the binder solution to the mixed first electrode slurry to form a second electrode slurry; and
mixing the second electrode slurry to prepare the electrode slurry, wherein a viscosity of the electrode slurry is in a range of 8,000 to 12,000 cps, and wherein a solid concentration of the electrode slurry is in a range of 60 to 70 percent by weight (wt %) based on the total weight of the electrode slurry.

2. The method according to claim 1, wherein a solid concentration of the first electrode slurry is in a range of 70 to 74 percent by weight (wt %) based on the total weight of the first electrode slurry.

3. The method according to claim 1, wherein a solid concentration of the electrode slurry is in a range of 60 to 68 percent by weight (wt %) based on the total weight of the electrode slurry.

4. The method according to claim 1, wherein a viscosity of the first electrode slurry is in a range of 16,000 to 52,000 cps.

5. The method according to claim 1, wherein a viscosity of the electrode slurry is in a range of 8,600 to 11,100 cps.

6. The method according to claim 1, wherein a content ratio of the first amount of the binder solution to the second amount of the binder solution is in a range between 8.8:1.2 and 6.6:3.4.

7. The method according to claim 1, wherein the binder is one or more selected from the group consisting of non-aqueous binders such as a vinylidene fluoride-hexafluoropropylene copolymer (PVDF-co-HEP), polyvinylidenefluoride, polyacrylonitrile, polymethyl methacrylate, polyvinyl alcohol, carboxymethylcellulose (CMC), starch, hydroxypropylcellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, polytetrafluoroethylene (PTFE), polyvinylidene fluoride (PVdF), and the like; aqueous binders such as an acrylonitrile-butadiene rubber, a styrene butadiene rubber (SBR), an acrylic rubber, and the like; and polymer resins such as hydroxyethyl cellulose, carboxymethyl cellulose, polyvinylidene fluoride, and the like.

8. The method according to claim 1, further comprising adding a thickener into the first electrode slurry or the second electrode slurry.

9. The method according to claim 1, wherein the electrode is a positive electrode or a negative electrode.

10. The method according to claim 1, wherein the electrode active material comprises a lithium transition metal oxide.

11. The method according to claim 10, wherein the lithium transition metal oxide is selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1 and a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2 and a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), and mixtures thereof.

12. The method of claim 1, wherein the first electrode slurry consists of the electrode active material, the conductive material, and the first amount of the binder solution, and wherein the second electrode slurry consists of the electrode active material, the conductive material, the first amount of the binder solution, and the second amount of the binder solution.

13. The method of claim 12, further comprising:
adjusting the content ratio of the first amount of the binder solution to the second amount of the binder solution to control the viscosity of the electrode slurry.

14. The method of claim 12, wherein the wherein the viscosity of the electrode slurry is independent of the solid content of the electrode slurry.

* * * * *